United States Patent
Martinez Pupo de Oliveira et al.

(10) Patent No.: US 11,792,353 B2
(45) Date of Patent: Oct. 17, 2023

(54) SYSTEMS AND METHODS FOR DISPLAYING USERS PARTICIPATING IN A COMMUNICATION SESSION

(71) Applicant: Avaya Management L.P., Durham, NC (US)

(72) Inventors: Fernanda Cristina Martinez Pupo de Oliveira, Santos (BR); Daniel Makoto Iguchi, Sao Paulo (BR); Ricardo Tavernaro Queiroz, Indaiatuba (BR); Bernardo Coelho, Sao Paulo (BR); Rosylene Gorski Damaceno Carbone, Lugano (CH)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/113,945

(22) Filed: Dec. 7, 2020

(65) Prior Publication Data
US 2022/0182557 A1    Jun. 9, 2022

(51) Int. Cl.
*H04N 5/272*      (2006.01)
*H04N 7/14*      (2006.01)
*G06V 40/16*      (2022.01)

(52) U.S. Cl.
CPC .......... *H04N 5/272* (2013.01); *G06V 40/161* (2022.01); *H04N 7/141* (2013.01)

(58) Field of Classification Search
CPC combination set(s) only.
See application file for complete search history.

(56) References Cited

U.S. PATENT DOCUMENTS

| 9,229,530 | B1* | 1/2016 | Wu | G06F 3/016 |
| 2006/0215753 | A1* | 9/2006 | Lee | H04N 19/17 |
| | | | | 375/E7.182 |
| 2008/0129844 | A1* | 6/2008 | Cusack | H04N 5/23229 |
| | | | | 348/241 |
| 2011/0008017 | A1* | 1/2011 | Gausereide | H04N 5/272 |
| | | | | 386/280 |

(Continued)

FOREIGN PATENT DOCUMENTS

| JP | 2006-333301 | 12/2006 |
| JP | 2009-081861 | 4/2009 |

(Continued)

OTHER PUBLICATIONS

Inoue et al. "A video communication system achieving pseudo same-room communication with a remote user: Being Here System," The Institute of Electronics, Information and Communication Engineers, 2012, IEICE Technical Report MVE2012-39, 7 pages (English abstract).

(Continued)

*Primary Examiner* — Phung-Hoang J Nguyen
(74) *Attorney, Agent, or Firm* — Sheridan Ross P.C.

(57) ABSTRACT

Systems and methods of the present disclosure include receiving, with a processor of the first user device, a first image from a first camera, receiving, with the processor, a first live video stream from a network location, generating, with the processor, a live image in real time, by superimposing a portion of the first live video stream received from the network location on to the first image received from the first camera, and displaying, with the processor, the generated live image.

17 Claims, 8 Drawing Sheets

(56) References Cited

U.S. PATENT DOCUMENTS

| | | | | |
|---|---|---|---|---|
| 2011/0066924 | A1* | 3/2011 | Dorso | G06F 11/202 |
| | | | | 714/776 |
| 2011/0243470 | A1* | 10/2011 | Noguchi | H04N 19/132 |
| | | | | 375/E7.126 |
| 2011/0249076 | A1* | 10/2011 | Zhou | H04N 5/272 |
| | | | | 348/14.02 |
| 2013/0258118 | A1* | 10/2013 | Felt | H04N 17/002 |
| | | | | 348/207.1 |
| 2013/0321563 | A1* | 12/2013 | Tamiya | H04N 5/272 |
| | | | | 348/14.07 |
| 2017/0289647 | A1* | 10/2017 | Lee | H04N 7/14 |
| 2018/0040304 | A1* | 2/2018 | Choi | H04N 5/23293 |
| 2018/0068490 | A1* | 3/2018 | Holmes | H04N 7/152 |
| 2020/0175581 | A1* | 6/2020 | Choi | G06F 3/002 |
| 2020/0222809 | A1* | 7/2020 | Gadre | G06Q 30/0601 |
| 2020/0226730 | A1* | 7/2020 | Thomas | G06Q 30/01 |
| 2020/0294317 | A1 | 9/2020 | Segal | |

FOREIGN PATENT DOCUMENTS

| | | |
|---|---|---|
| JP | 2015-122768 | 7/2015 |
| JP | 2016-515325 | 5/2016 |
| JP | 2019-168971 | 10/2019 |

OTHER PUBLICATIONS

Sugano et al. "Space-Sharing for Immersive Video Conferencing System," Institute of Image Information and Television Engineers, 2012, 2012 Winter Conference Proceedings, Session ID7-4, 2 pages (English abstract).

Official Action with Machine Translation for Japan Patent Application No. 2021-197764, dated Feb. 7, 2023 17 pages.

* cited by examiner

SYSTEMS AND METHODS FOR DISPLAYING USERS PARTICIPATING IN A COMMUNICATION SESSION

FIELD

The disclosure relates generally to communication applications and more particularly to presenting users in a communication session in an immersive and user-friendly manner.

BACKGROUND

As electronic user devices such as smart phones, tablets, computers, etc., become more commonplace, more and more communication between people occurs via remote voice and video communication applications such as FaceTime, Skype, Zoom, GoToMeeting, etc. More and more users all over the world are adopting a remote working culture. In order to collaborate effectively, users make use of a number of voice/video conferencing solutions. Besides simple one-to-one communication sessions, voice and video communication often takes place between a large number of people. For example, business meetings are often conducted without requiring participants to be physically present in a room.

Voice and video communication over the Internet have enabled real-time conversations. One communication session may take place between many participants. Each participant may have his or her own camera and/or microphone through which to be seen by and to speak to the other participants. In many contemporary video and/or audio communication applications, there is no limit to the number of participants, each of whom may speak at any time.

Today, users can choose between a wide range of communication systems capable of connecting people and helping those that are not able or allowed to be physical present with others. For example, due to pandemics such as Covid-19 giving rise to isolation restrictions, it may be challenging to visit or meet isolated people such as patients or relatives.

While the ability for participants to speak and see each other remotely during a communication session provides a great potential for efficient communication, the remoteness of a communication session carries some negative aspects. It is quite common for users to remotely participate in a business meeting or technical discussion meeting or to speak and see family when be physically present with each other is infeasible. When users communicate remotely, users are forced to see each other through a display in a user interface window. Each user is presented as recorded by his or her camera.

Such a display reduces the quality of experience for the participants of a communication session as there is no escaping the realization that each user is in a separate place a distance away from the other users, resulting in a disconnect which breaks the immersive feeling of a face-to-face chat. Such a disconnect can greatly limit the enjoyability and effectiveness of a communication session.

Some contemporary attempts to make long distance communications feel like close, face-to-face visits involve using multiple cameras or a LiDAR system to create a hologram or using avatars to present each user in a virtual world. Such systems are either too complex or fail to present a user-friendly and immersive experience. What is needed is a simple system which requires no more than everyday technology to present a user-friendly and immersive video communication session. Such a communication system should be capable of resolving the above described issues with conventional communication systems.

DETAILED DESCRIPTION

Figure 1:
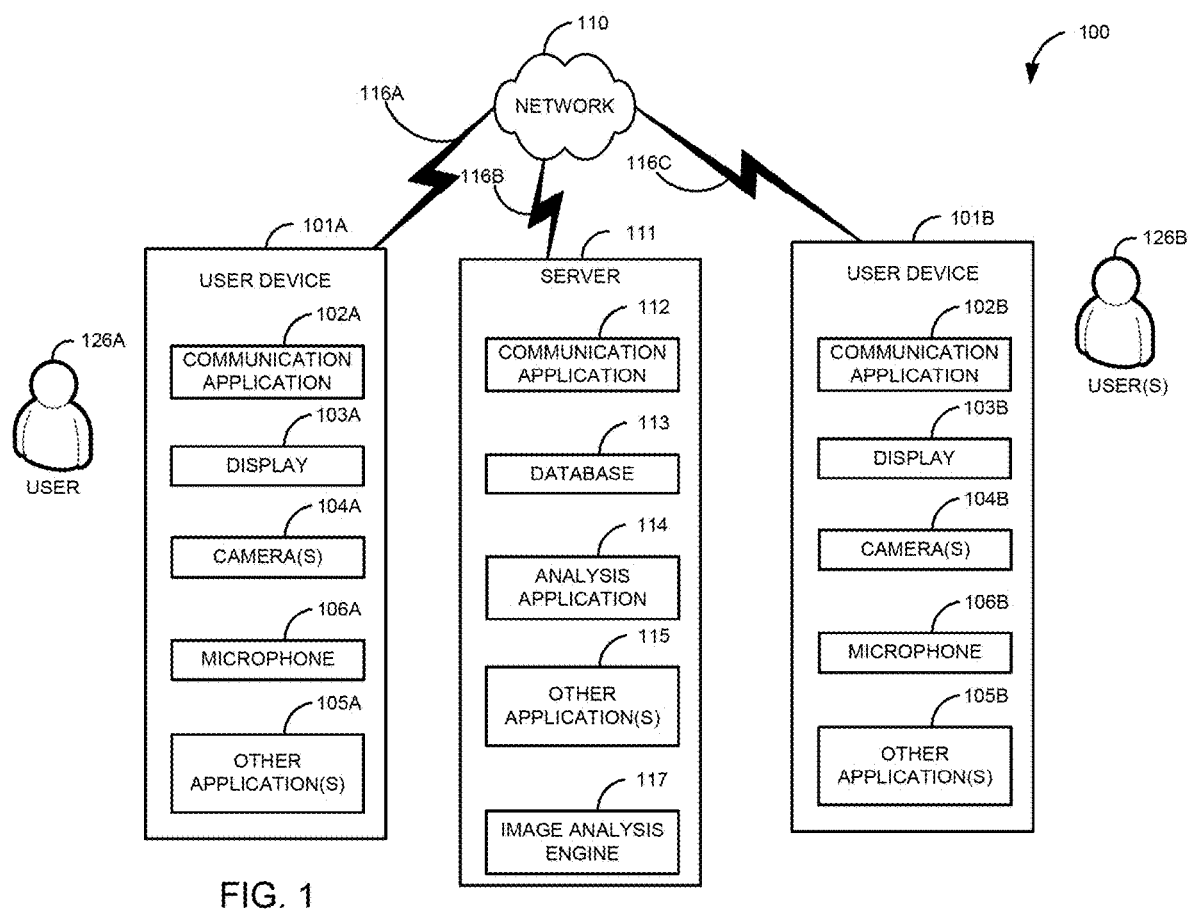
FIG. 1 is a block diagram of a first illustrative system for implementing a communication session in accordance with one or more embodiments of the present disclosure.

The above discussed issues with contemporary communication applications and other needs are addressed by the various embodiments and configurations of the present disclosure. As described herein, a communication session may be established between two or more users. One or more of the users participating in the communication session may use a user device comprising a rear facing camera. The rear facing camera may be used to capture an image, such as a live video, of the user's environment. The image taken by the rear facing camera may be used as a background image for to display an augmented reality view of the other users in the communication session. For example, it may appear to the user that the other users in the communication session are present in the user's own environment. Such a system as described herein provides a rich experience to users participating in a communication session.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

FIG. 1 is a block diagram of a first illustrative system 100 for communication session between one or more users in accordance with one or more of the embodiments described herein. The first illustrative system 100 comprises user communication devices 101A, 101B and a network 110. In addition, users 126A, 126B are also shown.

The user communication devices 101A, 101B can be or may include any user device that can communicate on the network 110, such as a Personal Computer ("PC"), a video phone, a video conferencing system, a cellular telephone, a Personal Digital Assistant ("PDA"), a tablet device, a notebook device, a smartphone, and/or the like. The user communication devices 101A, 101B are devices where a communication session ends. Although only two user communication devices 101A, 101B are shown for convenience in FIG. 1, any number of user communication devices 101 may be connected to the network 110 for establishing a communication session.

The user communication devices 101A, 101B may each further comprise communication applications 102A, 102B, displays 103A, 103B, cameras 104A, 104B, and microphones 106A, 106B. It should be appreciated that, in some embodiments, user certain devices used in accordance with embodiments described herein may lack cameras. In certain embodiments of the present disclosure, a first user device may include a front-facing camera and a rear-facing camera. In some embodiments, a user device may comprise a rear-facing camera and no front-facing camera or vice versa. Also, while not shown for convenience, the user communication devices 101A, 101B typically comprise other elements, such as a microprocessor, a microphone, a browser, other applications, and/or the like.

The displays 103A, 103B can be or may include any hardware display/projection system that can display an image of a video conference, such as a LED display, a plasma display, a projector, a liquid crystal display, a cathode ray tube, and/or the like. The displays 103A-103B can be used to display user interfaces as part of communication applications 102A-102B.

In addition, the user communication devices 101A, 101B may also comprise other application(s) 105A, 105B. The other application(s) 105A can be any application, such as, a slide presentation application, a document editor application, a document display application, a graphical editing application, a calculator, an email application, a spreadsheet, a multimedia application, a gaming application, and/or the like. The communication applications 102A, 102B can be or may include any hardware/software that can manage a communication session that is displayed to the users 126A, 126B. For example, the communication applications 102A, 102B can be used to establish and display a communication session.

Microphones 106A, 106B may comprise, for example, a device such as a transducer to convert sound from a user or from an environment around a user communication devices 101A, 101B into an electrical signal. In some embodiments, microphone 106A, 106B, may comprise a dynamic microphone, a condenser microphone, a contact microphone, an array of microphones, or any type of device capable of converting sounds to a signal.

The user communication devices 101A, 101B may also comprise one or more other application(s) 105A, 105B. The other application(s) 105A, 105B may work with the communication applications 102A, 102B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocols, audio protocols, Integrated Services Digital Network (ISDN), and the like. Thus, the network 110 is an electronic communication network configured to carry messages via packets and/or circuit switched communications.

The network may be used by the user devices 101A, 101B, and a server 111 to carry out communication. During a communication session, data 116A, such as a digital or analog audio signal or data comprising audio and video data, may be sent and/or received via user device 101A, data 116B may be sent and/or received via server 111, and data 116C may be sent and/or received via user device 101B.

The server 111 may comprise any type of computer device that can communicate on the network 110, such as a server, a cloud-based system, a Personal Computer ("PC"), a video phone, a video conferencing system, a cellular telephone, a Personal Digital Assistant ("PDA"), a tablet device, a notebook device, a smartphone, and/or the like. Although only one server 111 is shown for convenience in FIG. 1, any number of servers 111 may be connected to the network 110 for establishing a communication session.

The server 111 may further comprise a communication application 112, database(s) 113, analysis applications 114, other application(s) 115, and, while not shown for convenience, other elements such as a microprocessor, a dedicated media processor, a browser application, and/or the like.

In some embodiments, a server 111 may comprise an image analysis engine 117. The image analysis engine 117 may be responsible for image analysis and processing. For example, upon receiving an image signal from a user device 101A, 101B, participating in a communication session, the image analysis engine 117 may process the image signal to filter or otherwise separate image including a user's face or body from other images such as the background. The image analysis engine 117 may execute one or more artificial intelligence algorithms or subsystems capable of identifying human faces or bodies or otherwise distinguishing between people and other visual data.

Figure 2A:
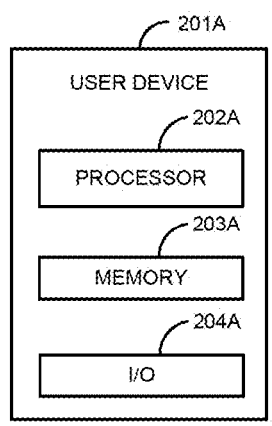
FIG. 2A is a block diagram of a user device system for executing a communication session in accordance with one or more embodiments of the present disclosure.
Figure 2B:
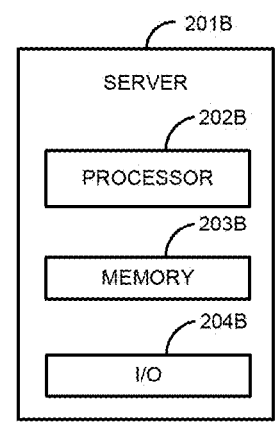
FIG. 2B is a block diagram of a server for executing a communication session in accordance with one or more embodiments of the present disclosure.

FIGS. 2A and 2B illustrate components of an exemplary user device 201A and server 201B for use in certain embodiments as described herein. In some embodiments, a user device 201A may comprise a processor 202A, memory 203A, and input/output devices 204A. Similarly, a server 201B may comprise a processor 202B, memory 203B, and input/output devices 204B.

A processor 202A, 202B may comprise one or more processors and/or microprocessors. As used herein, processor may refer to a single processor or microprocessor or a plurality of processors and/or microprocessors operating together. Processors 202A, 202B may be capable of executing software and performing steps of methods as described herein. For example, a processor 202A, 202B may be configured to display user interfaces on a display of a computer device. Memory 203A, 203B of a user device 201A, 201B may comprise memory, data storage, or other non-transitory storage device configured with instructions for the operation of the processor 202A, 202B to perform steps described herein. Accordingly, processes may be embodied as machine-readable and machine-executable code for execution by a processor to perform the steps herein and, optionally, other processing tasks. Input/output devices 204A, 204B may comprise, but should not be considered as limited to, keyboards, mice, microphones, cameras, touch screen devices, display devices, network cards, etc.

Figure 7:
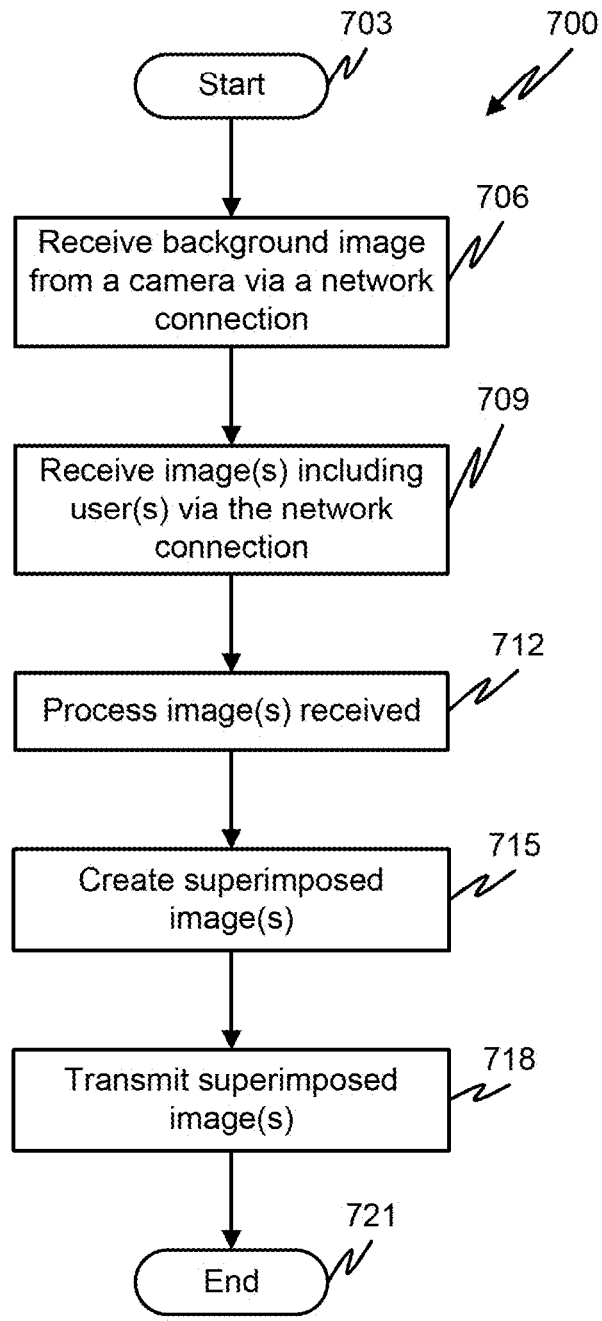
FIG. 7 is a flow diagram of a process in accordance with one or more embodiments of the present disclosure.

Illustratively, the user communication devices 101A, 101B, the server 111, the communication applications, the displays, the application(s), may be stored program-controlled entities, such as a computer or microprocessor, which performs the method of FIG. 7 and the processes described herein by executing program instructions stored in a computer readable storage medium, such as a memory (i.e., a computer memory, a hard disk, and/or the like). Although the method described in FIG. 7 is shown in a specific order, one of skill in the art would recognize that the steps in FIG. 7 may be implemented in different orders and/or be implemented in a multi-threaded environment. Moreover, various steps may be omitted or added based on implementation.

In some embodiments, a communication session may comprise two or more users of user devices 101A, 101B communicating over the Internet using a communication application such as a video conferencing application. For example, the systems and methods described herein may be applied to any type of video chat application such as FaceTime™, Skype™, Zoom™, Avaya Spaces™ or other systems in which two or more users communicate using video.

Due to processing power requirements to separate a video signal of a user participating in a communication session into an image of a user and a background image, it may in some embodiments be impractical to process video signals by a user device, i.e. on the client end. Instead, the complete video signal may be transmitted to a server hosting the communication session, consuming higher network bandwidth than would be required if the video signal is processed prior to transmission. Using a server to execute a video analysis process as described herein may be similarly impractical as complex deep learning algorithms may be required to be executed with several iterations in order to accurately separate the proper portion of video from the rest of the video signal as described herein.

As described herein, a richer experience may be provided to participants of a communication session using the systems and methods described herein. As described herein, a computer system, such as a user device, may be used to execute a video conference or communication session. For example, each user participating in a video communication session may use a user device such as a smartphone, tablet, or computer. Each user device may have one or more cameras. In exemplary embodiments, a first user may use a first user device having a front facing camera and a rear facing camera such as a conventional smartphone, laptop, or tablet. During the video communication session, the front facing camera may be used to record a first video signal including a face of the first user which the rear facing camera may be used to record a second video signal including an environment in which the first user is participating in the video communication session.

For example, consider a first user sitting at a head of a table in a conference room. The first user may be using a first user device such as a laptop sitting on the table in front of the first user or a smartphone held by the first user to join a communication session. Other users participating in the communication session may be in other rooms using other user devices. The user device used by the first user may have a first camera pointed at the first user and a second camera pointing away from the first user. The second camera may capture a view of the conference room from the point of view of the first user. The other users participating in the communication session may be recorded by cameras pointing at their faces. Video signals taken of the other users may be transmitted by the user devices to the user device of the first person. Using a system or method as described herein, the first user in the conference room may be presented with a newly created image created by the first user's user device, a server, or another user device. The newly created image may use, as a background, the video signal taken by the second camera pointing away from the first user and may use, as a foreground, a portion of each video signal taken by each user device of each other user participating in the communication session. The portions of each video signal taken by each user device of each user participating in the communication session may be cropped videos search that the portions used in the newly created image include only faces or images of users in the videos as opposed to including any type of non-human image.

Figure 3:
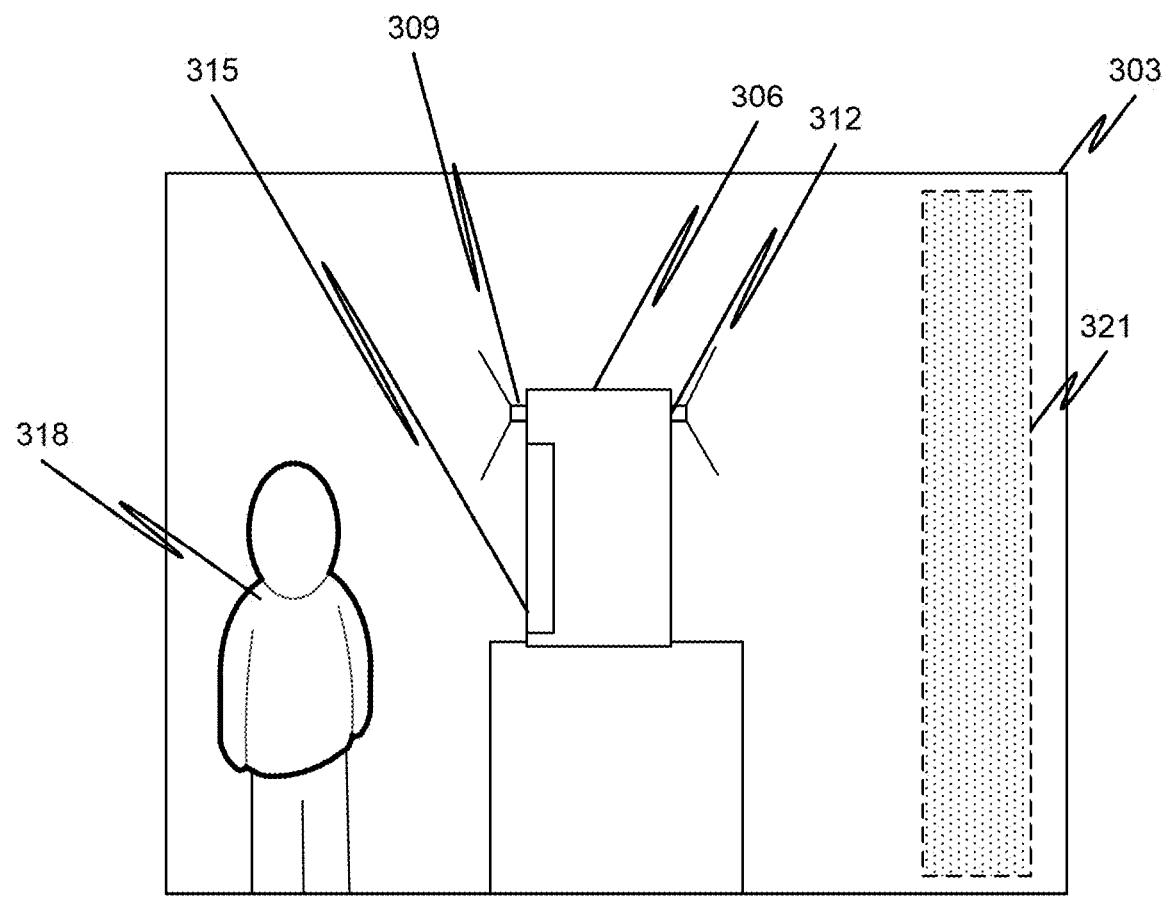
FIG. 3 is a block diagram of a user device system for executing a communication session in accordance with one or more embodiments of the present disclosure.

As illustrated in FIG. 3, a user 318 an environment 303 may be using a user device 306. The user device 306 may comprise a front facing camera 309, a rear facing camera 312, and a display device 315. The user device 306 may in some embodiments be a smartphone and maybe handheld. It should be appreciated that the user device 306 may take the form of nearly any type of user device capable of capturing images. In some embodiments the user device may comprise cameras external to the user device. For example, the user device may communicate wirelessly or by a wired connection with one or more cameras. The front facing camera 309 may capture an image of the user 318 while the rear facing camera 312 may capture a portion 321 of the environment 303. For example, if the user 318 is sitting in a living room the rear facing camera 312 may capture a couch or table or other features of the living room.

Figure 4A:
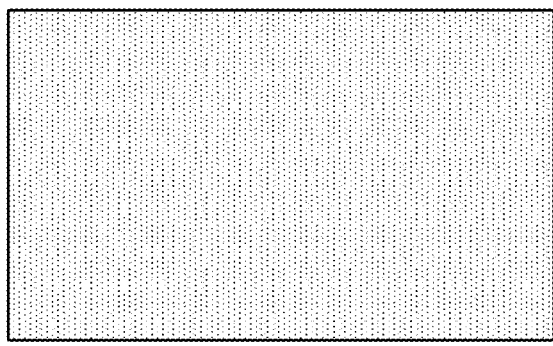
FIG. 4A is an illustration of a camera view in accordance with one or more embodiments of the present disclosure.

FIGS. 4A-4D illustrate an exemplary embodiment in which a first user speaks with a second user in a communication session. FIG. 4A illustrates a view 403 of a rear facing camera 312 of a user device associated with the first user. For illustration purposes, the view 403 is simplified as a field of dots, though it should be appreciated that the view 403 of the rear facing camera 312 may include any visual image recorded by a camera. For example, the rear facing camera 312 may capture a conference room with or without people, a living room, or other type of environment.

Figure 4B:
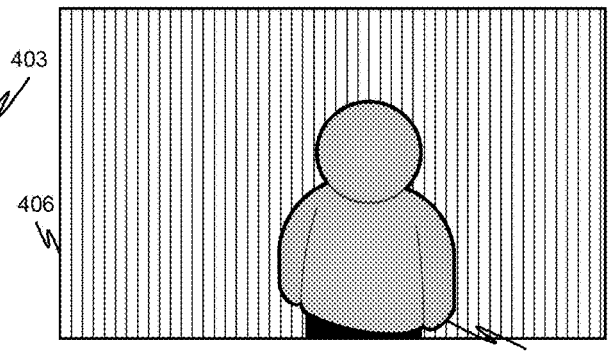
FIG. 4B is an illustration of a camera view in accordance with one or more embodiments of the present disclosure.

FIG. 4B illustrates a view 406 including an image of the second user 409 participating in the communication session as captured by a camera of a user device used by the second user 409. For illustration purposes, the background of the view 406 is illustrated as a series of vertical lines, though it should be appreciated that the background of the view 406 including the second user 409 may simply be any view as captured by a front facing camera on a user device of the second user.

Figure 4C:
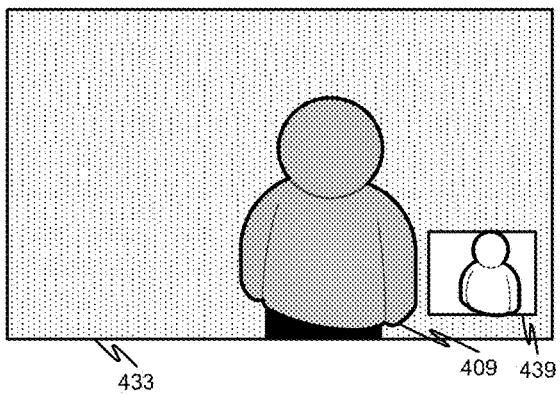
FIG. 4C is an illustration of a user interface in accordance with one or more embodiments of the present disclosure.
Figure 4D:
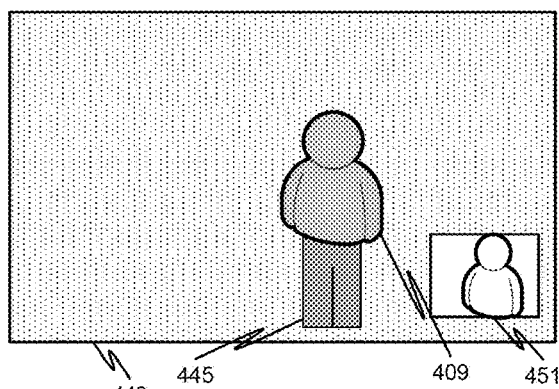
FIG. 4D is an illustration of a user interface in accordance with one or more embodiments of the present disclosure.

FIGS. 4C and 4D illustrate two exemplary embodiments of a user interface displayed to the first user participating in the communication session while speaking to the second user. As illustrated in FIG. 4C, a user interface 433 may display the image of the second user 409 with the background as the view 403 of the rear facing camera 312 of the user device associated with the first user as illustrated in FIG. 4A. The user interface 433 may also include a visual representation of the video signal received by the front facing camera of the user device associated with the first user 439.

As illustrated in FIG. 4D, similar to FIG. 4C, the user interface 442 may display the image of the second user 409 with a background being the view 403 of the rear facing camera 312 of the user device associated with the first user as illustrated in FIG. 4A. The user interface 442 may also include a visual representation of the video signal received by the front facing camera of the user device associated with the first user 451. In the embodiment illustrated in FIG. 4D, the image of the second user 409 may be superimposed onto a virtual body or avatar 445. In this way, in the event that the camera of the user device used by the second user does not capture the entire body of the second user, the second user may be illustrated naturally in the environment of the first user.

Figure 5A:
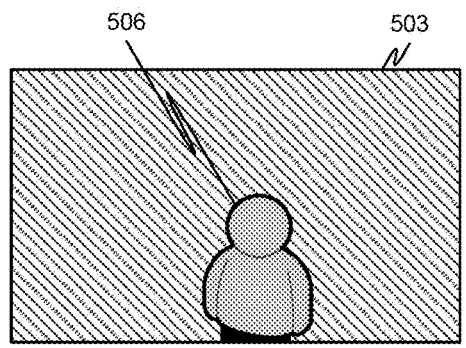
FIG. 5A is an illustration of a camera view in accordance with one or more embodiments of the present disclosure.
Figure 5B:
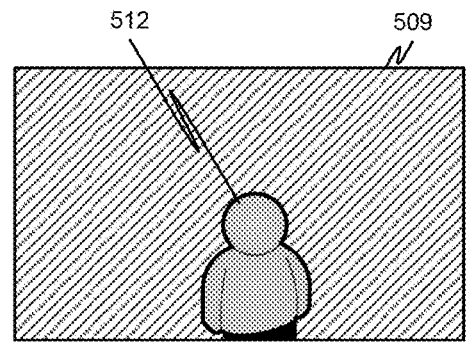
FIG. 5B is an illustration of a camera view in accordance with one or more embodiments of the present disclosure.
Figure 5C:
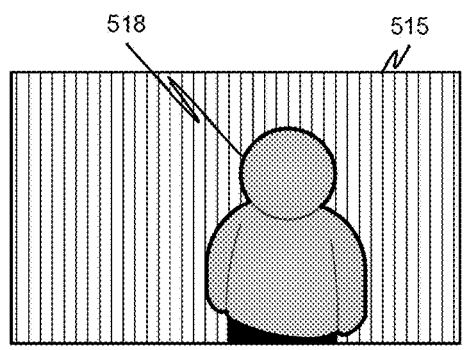
FIG. 5C is an illustration of a camera view in accordance with one or more embodiments of the present disclosure.
Figure 5D:
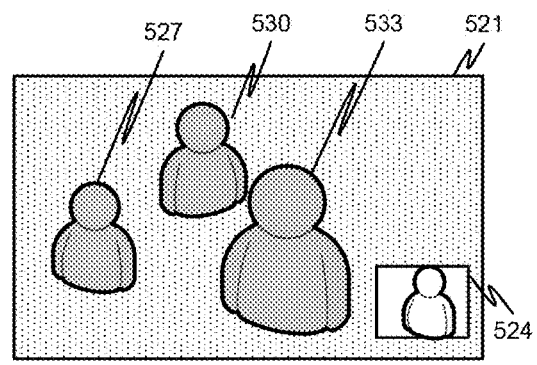
FIG. 5D is an illustration of a user interface in accordance with one or more embodiments of the present disclosure.

In some embodiments of the present disclosure, a first user may communicate with a plurality of other users and be presented with a video image presenting each of the plurality of other uses in the environment of the first user as captured by a rear facing camera of a user device associated with the first user. To continue the example of FIG. 4A, in which a rear facing camera of a first user device associated with a first user captures a video image 403, a second user device may capture a second video image 503 including a second user 506 as illustrated in FIG. 5A, a third user device may capture a third video image 509 including a third user 512 as illustrated in FIG. 5B, and a fourth user device may capture a fourth video image 515 including a fourth user 518 as illustrated in FIG. 5C. As should be appreciated, each of the second, third, and fourth video images 503, 509, and 515 may include various background imagery. During the communication between the first, second, third, and fourth users, the first user may be shown a user interface 521 displaying a first edited video image 527 of the second user 506, a second edited video image 530 of the third user 512, and a third edited video image 533 of the fourth user 518 set onto the video image 403 captured by the rear facing camera of the first user device associated with the first user. The user interface 521 may also include a display 524 of a video signal including the first user as captured by a front facing camera of the first user device associated with the first user.

Figure 6:
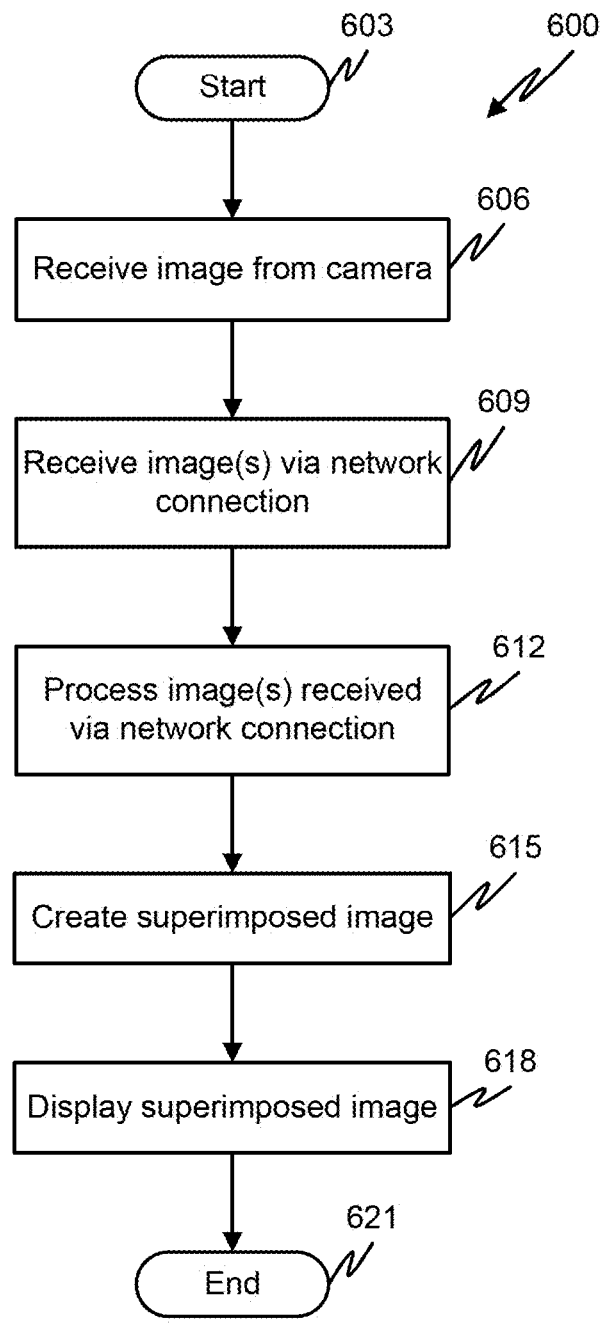
FIG. 6 is a flow diagram of a process in accordance with one or more embodiments of the present disclosure.

The above-discussed embodiments of communication sessions in which users in other places are displayed in an environment captured by a camera of a user device in a local place may be achieved by a method 600 as illustrated by FIG. 6. As illustrated in FIG. 6, a process of executing a communication session may be performed by a processor of a user device. In some embodiments, the processor may be of a user device such as a smartphone or personal computer. The user device used in the method 600 comprises and/or is in communication with one or more cameras. In some embodiments, a processor of a server or other network-connected device may be used. The process of FIG. 6 may begin at step 603 in which a communication session between two or more user devices has been established. The communication session may be, for example, a video conference using a video conferencing communication application.

At step 606, a processor of a user device may capture an image from a camera. In some embodiments, the camera may be a rear facing camera of the user device. In some embodiments, the camera may be external to the user device. The image may be a video signal or may be a still image. Optionally, the user device may further capture an image from a second camera, such as an image of a user of the user device using a front facing camera. The user device may also capture an audio signal from a microphone of the user device or from a separate user device. For example, upon joining a communication session, a user device of a user participating in the communication session may activate a microphone and one or more cameras. The microphone may begin to collect audio data which may be received by the processor. The cameras may begin to collect image data which may be received by the processor. The audio information may be sent via a network connection and received by a processor of a separate device. The image data from the one or more cameras may be transmitted via the network connection or may first be processed as described herein. The image received from the camera may be described as an environment image or a background image. It should be appreciated that while the word image is used, the environment image or background image may comprise a live video stream.

At step 609, the user device may receive one or more images via a network connection. For example, images may be sent from one or more other user devices of users participating in the communication session. The images received via the network connection may be live video images of participants in the communication session.

At step 612, the processor of the user device may process the one or more images received via the network connection. Processing the images may comprise using an image analysis application or algorithm to detect the existence of human imagery in the received images. For example, a neural network algorithm such as a convolutional neural network may be used to detect a human figure or face in the images. Processing the images may also comprise extracting detected human imagery.

For example, all background imagery may be removed from a received image, leaving only human imagery. In some embodiments, faces may be extracted from images while in other embodiments all human imagery may be extracted. For example, the processor may be capable of receiving an image signal comprising an image of a person in front of or among background imagery or other imagery. The processor may be capable of separating the person from the rest of the image to generate an extracted image of the person.

The processor may, in the case of a communication session between more than two users, extract a person from each image received from each user device participating in the communication session. It should be appreciated that each image may contain more than one person, for example two people could be sharing a single user device to participate in the communication session. In such a scenario, the processor may extract all persons from an image. It should also be appreciated that while the words persons and human imagery are used, the same process may be used to extract other imagery such as animals.

At step 615, the processor may create a superimposed image using the processed image or images of step 612 and the image received from the camera in step 606. In some embodiments, creating the superimposed image may comprise overlaying the extracted image of the user from the image received via the network connection onto the image received from the camera. In some embodiments, creating the superimposed image may comprise generating a visual representation of a body, such as an avatar, onto the image received from the camera and overlaying a face of a user extracted from the image received via the network connection onto the visual representation of the body, for example as illustrated in FIG. 4D. In some embodiments, users may be capable of selecting an avatar to be used in the process 600. For example, users may be presented with a menu displaying avatar choices. Users may be capable of selecting which avatar among the avatar choices should be used for the user's visual representation of the body. It should be appreciated that the superimposed image created in step 615 may be a video image and each of the background image received from the camera in step 606 and the image of the user received in step 609 may be constantly refreshed at a frame rate of, for example, sixty frames per second.

After generating the superimposed image in step 615, the process 600 may comprise displaying the superimposed image on a display device of the user device at step 621. In some embodiments, an image taken by a front facing camera may also be displayed, for example as illustrated in FIGS. 4C and 4D. The process 600 may end at step 621.

The above-discussed embodiments of communication sessions in which users in other places are displayed in an environment captured by a camera of a user device in a local place may also be achieved by a method 700 performed by a processor of a server hosting a communication session as illustrated by FIG. 7. As illustrated in FIG. 7, a process of executing a communication session may be performed by a processor of a server. The process of FIG. 7 may begin at step 703 in which a communication session between two or more user devices has been established. The communication session may be hosted by the server. The user devices used in the method 700 may comprise and/or be in communication with one or more cameras. The communication session may be, for example, a video conference using a video conferencing communication application.

At step 706, the processor of the server may receive an image from a camera via a network connection. For example, in some embodiments, the camera may be a rear facing camera of a user device. In some embodiments, the camera may be external to the user device. The image may be a video signal or may be a still image. In some embodiments, the processor may receive an image from a rear facing camera from each user device participating in the communication session. In this way, each user may be presented, by the end of the process, with a superimposed image using a background image taken by the rear facing camera of his or her own user device. The image data from the camera or cameras may be transmitted to the server via the network connection or may first be processed as described herein. The image received from the camera may be described as an environment image or a background image. It should be appreciated that while the word image is used, the environment image or background image may comprise a live video stream.

At step 709, the server may receive one or more images via a network connection. For example, images may be sent from one or more user devices of users participating in the communication session. The images received via the network connection may be live video images of participants in the communication session. The images may be recorded by front facing cameras of the user devices of users participating in the communication session.

At step 712, the processor of the server may process the one or more images received via the network connection. Processing the images may comprise using an image analysis application or algorithm to detect the existence of human imagery in the received images. For example, a neural network algorithm such as a convolutional neural network may be used to detect a human figure or face in the images. Processing the images may also comprise extracting detected human imagery.

For example, all background imagery may be removed from a received image, leaving only human imagery. In some embodiments, faces may be extracted from images while in other embodiments all human imagery may be extracted. For example, the processor may be capable of receiving an image signal comprising an image of a person in front of or among background imagery or other imagery. The processor may be capable of separating the person from the rest of the image to generate an extracted image of the person.

The processor may, in the case of a communication session between more than two users, extract a person from each image received from each user device participating in the communication session. It should be appreciated that each image may contain more than one person, for example two people could be sharing a single user device to participate in the communication session. In such a scenario, the processor may extract all persons from an image. It should also be appreciated that while the words persons and human imagery are used, the same process may be used to extract other imagery such as animals.

At step 715, the processor of the server may create a superimposed image using the processed image or images of step 712 and the image received from the camera in step 706. In some embodiments, creating the superimposed image may comprise overlaying the extracted image of the user from the image received via the network connection onto the image received from a rear facing camera. In some embodiments, creating the superimposed image may comprise generating a visual representation of a body, such as an avatar, onto the image received from the camera and overlaying a face of a user extracted from the image received via the network connection onto the visual representation of the body, for example as illustrated in FIG. 4D. It should be appreciated that the superimposed image created in step 715 may be a video image and each of the background image received from the camera in step 706 and the image of the user received in step 709 may be constantly refreshed at a frame rate of, for example, sixty frames per second.

In some embodiments, the server may generate a different superimposed image for each user device participating in the communication session. For example, each user device may transmit a front facing image and a rear facing image. The rear facing image of a first user device may be used to generate a first superimposed image containing faces of users other than the user of the first user device taken by front facing cameras of user devices other than the first user device. The front facing image of the first user device may be used to add a face of the user of the first user device to a background image taken by other user devices participating in the communication session. As can be appreciated, for each user device participating in the communication session, the server may generate a different superimposed image.

After generating the superimposed image in step 715, the process 700 may comprise transmitting the superimposed image to a user device to be displayed on a display device of the user device at step 721. In some embodiments, an image taken by a front facing camera may also be displayed, for example as illustrated in FIGS. 4C and 4D. The process 700 may end at step 721.

As should be appreciated, using a server-based process 700 as described in relation to FIG. 7, a server may be configured to receive a background live stream video, add images of one or more the users in real time and distribute a superimposed image to one or more users. In some embodiments, each user may be presented with an augmented version of his or her own environment, while in other embodiments, each user may be presented with an augmented version of another user's environment displaying one or more or all of the users participating in the communication session.

While the above-discussed process 700 of FIG. 7 describes steps performed by a processor of a server and the above-discussed process 600 of FIG. 6 describes steps performed by a processor of a user device, it should be appreciated that a processor of a server and a processor of a user device may work in tandem to perform similar methods. For example, instead of transmitting the rear facing image, the user device may transmit only a front facing image. The server may then process the front facing image to extract human imagery from the front facing image. The extracted human imagery may then be sent to other user devices participating in a communication session which may append the human imagery from other users to an image taken by a rear facing camera of that user device. Such a system may require less bandwidth than similar systems.

Figure 8:
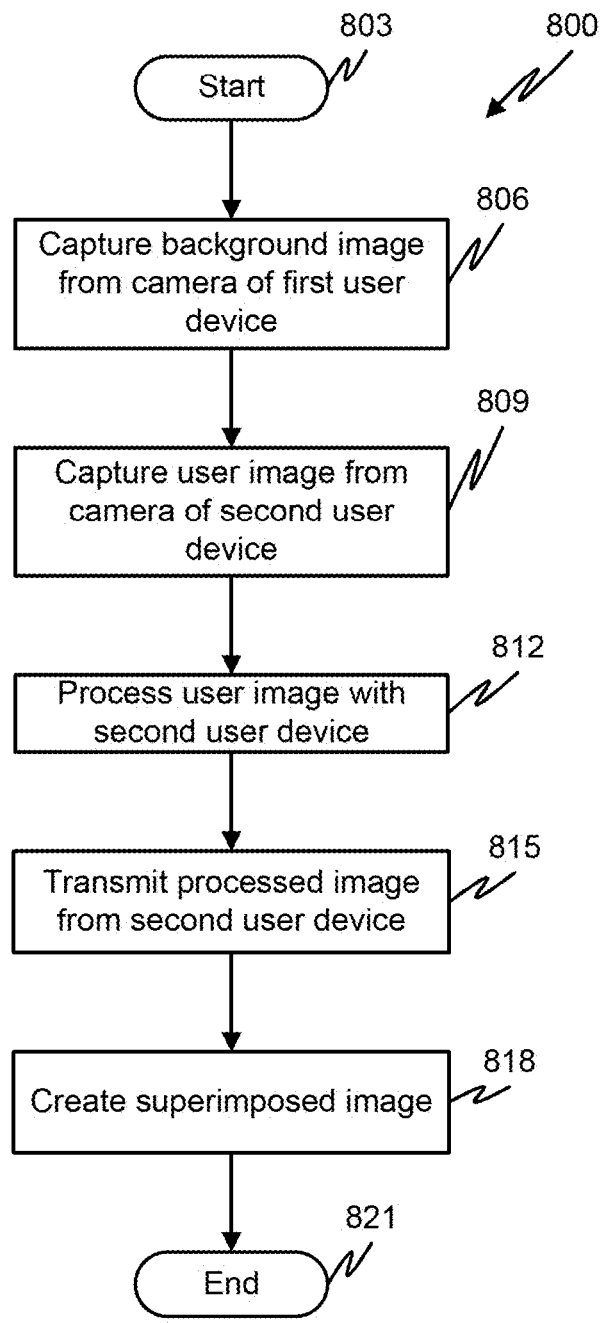
FIG. 8 is a flow diagram of a process in accordance with one or more embodiments of the present disclosure.

The above-discussed embodiments of communication sessions in which users in other places are displayed in an environment captured by a camera of a user device in a local place may also be achieved by a method 800 performed by one or more processors of computer systems participating in a communication session as illustrated by FIG. 8. The method 800 as described herein may enable reduced bandwidth and processing loads required for the features described herein. As described below, image processing and background removal may be performed by a processor of the user device capturing the image which splits processing loads and reduces bandwidth.

The method 800 of FIG. 8 may begin at step 803 in which a communication session between two or more user devices has been established. The communication session may be hosted by a server. The user devices used in the method 800 may comprise and/or be in communication with one or more cameras. The communication session may be, for example, a video conference using a video conferencing communication application.

At step 806, a processor of a first user device may receive an image from a camera. For example, in some embodiments, the camera may be a rear facing camera of the first user device. In some embodiments, the camera may be external to the first user device. The image may be a video signal or may be a still image.

At step 809, a processor of a second user device may receive one or more images from a camera. For example, images may be of users participating in the communication session. The images received by the processor may be live video images of participants in the communication session. The images may be recorded by one or more front facing cameras of the second user device of users participating in the communication session.

At step 812, the processor of the second user device may process the one or more images received via the camera. Processing the images may comprise using an image analysis application or algorithm to detect the existence of human imagery in the received images. For example, a neural network algorithm such as a convolutional neural network may be used to detect a human figure or face in the images. Processing the images may also comprise extracting detected human imagery.

For example, all background imagery may be removed from a received image, leaving only human imagery. In some embodiments, faces may be extracted from images while in other embodiments all human imagery may be extracted. For example, the processor may be capable of receiving an image signal comprising an image of a person in front of or among background imagery or other imagery. The processor may be capable of separating the person from the rest of the image to generate an extracted image of the person. It should be appreciated that each image may contain more than one person, for example two people could be sharing a single user device to participate in the communication session. In such a scenario, the processor may extract all persons from an image. It should also be appreciated that while the words persons and human imagery are used, the same process may be used to extract other imagery such as animals.

The image data, after the background imagery has been removed, may be transmitted by the second user device to the first user device via the network connection either directly or via a server in step 815.

At step 818, the processor of the first user device may create a superimposed image using the processed image or images of step 812 and the background image received from the camera of the first user device in step 806. In some embodiments, creating the superimposed image may comprise overlaying the extracted image of the user from the image received via the network connection onto the image received from a rear facing camera. In some embodiments, creating the superimposed image may comprise generating a visual representation of a body, such as an avatar, onto the image received from the camera and overlaying a face of a user extracted from the image received via the network connection onto the visual representation of the body, for example as illustrated in FIG. 4D. It should be appreciated that the superimposed image created in step 815 may be a video image and each of the background image received from the camera in step 806 and the image of the user received in step 709 may be constantly refreshed at a frame rate of, for example, sixty frames per second. The process 800 may end at step 821.

The method 800 as described above may enable reduced bandwidth and processing loads required for the features described herein. As described below, image processing and background removal may be performed by a processor of the user device capturing the image which splits processing loads and reduces bandwidth.

Certain embodiments described herein involve presenting a live video call to a user of a user device. The user device may receive a first image from a first camera. For example, the first image may be taken from a rear-facing camera of the user device and may capture the environment in which the user is participating in the live video call.

In some embodiments, a designated application may be used to execute one or more of the systems and processes described herein. For example, an application may facilitate a communication session between two or more users. A first user may in some embodiments be designated a host user. The host user may use a user device comprising a front facing camera to capture the image of the host user and a rear facing camera to capture the environment of the host user.

Other users may be designated visiting users. Each visiting user may use a user device comprising a front facing camera to capture the image of each visiting user. Each visiting user's user device may stream image data to a server and/or the host user. The application may facilitate cropping each stream of image data from the user device of each visiting user to crop out human imagery and to render the cropped out human imagery onto the live video stream of the host's environment captured by the host's rear facing camera.

In some embodiments, the application may be capable of detecting whether the entire body of a user is contained within the image from a visitor's user device. If the entire body of the user is contained within the image, the application may display the entire body of the user onto the host's environment image. On the other hand, if the entire body of the user is not contained within the image, the application may display only the face of the user onto an avatar and display the face and avatar in the host's environment image.

In some embodiments, if two or more visiting users are participating in a communication session, the application may determine the space required to include each visiting user in the host environment. Based on the space required to include each visiting user in the host environment, the application may resize the cropped images of each visiting user as needed to fit within the environment.

In some embodiments, instead of using a live image from a user's rear facing camera as a background image for the augmented reality view of the superimposed image, users may be enabled by the application to select among other backgrounds. A still image may be used or a video stream of a camera other than the user's rear camera. For example, a user may be enabled to select a live video stream from a network location which may be used as a background image for displaying the images of the user and/or other users participating in the communication session.

In some embodiments, the application may be configured to allow users to selectively record a communication session. For example, a record button may be presented within a user interface during a communication session. The host environment, displaying the faces and/or bodies of the visiting users may be recorded as a video file. In some embodiments, users may be enabled to record screenshots during a communication session.

As can be appreciated, systems and methods in accordance with one or more embodiments of the present disclosure include receiving a live video stream from a camera of a user device during a communication session. The live video stream may be transmitted over a network location. A processor may be used to generate a live image, in real time, by superimposing a portion of the live video stream on to an image received from a rear facing camera of a user device. The generated live image may then be displayed to one or more users of the communication session.

In some embodiments, a processor may be configured to process a live video stream to detect a face of a user within an image, such a live video stream, and extract pixels of the first live video stream associated with the detected face of the user. For example, the processor may be capable of detecting which pixels within a live video stream represent a face and/or a body of a user. Such pixels may be identified and may be cropped from the rest of the image data. The pixels represented the face and/or body of the user may be superimposed onto a live video stream of a host environment captured by a rear facing camera of a user device. In this way, a live image may be generated, portraying a distant user in a local environment.

Embodiments of the present disclosure include a method of presenting a live video call, the method comprising performing operations as follows on a processor of a first user device: receiving a first image from a first camera; receiving a first live video stream from a network location; generating a live image in real time, by superimposing a portion of the first live video stream received from the network location on to the first image received from the first camera; and displaying the generated live image.

Aspects of the above method include wherein the first user device comprises the first camera and a second camera, the method further comprising receiving, with the processor, a second image from the second camera and transmitting, with the processor, the second image to the network location.

Aspects of the above method include the method further comprising processing, with the processor, the first live video stream to detect a face of a user and extracting, with the processor, pixels of the first live video stream associated with the detected face of the user.

Aspects of the above method include wherein the portion of the first live video stream comprises the extracted pixels of the first live video stream associated with the detected face of the user.

Aspects of the above method include the method further comprising superimposing the pixels of the first live video stream associated with the detected face of the user on to a visual representation of a body.

Aspects of the above method include wherein the first image from the first camera is taken in a direction opposite a direction of a first user of the first user device in relation to the first user device.

Aspects of the above method include wherein the live image portrays a user of a second user device in front of the rear facing camera of the first user device.

Aspects of the above method include the method further comprising receiving, with the processor, a second live video stream from a second network location, wherein generating the live image in real time comprising superimposing the portion of the first live video stream and a portion of the second live video stream on to the first image received from the first camera.

Aspects of the above method include wherein the first live video stream is received from a second user device associated with a second user and the second live video stream is received from a third user device associated with a third user.

Aspects of the above method include wherein the live image portrays the second user and the third user in front of the rear facing camera of the first user device.

Aspects of the above method include wherein the first image is a live video.

Aspects of the above method include superimposing the portion of the first live video stream received from the network location on to the first image received from the first camera comprises superimposing the portion of the first live video stream onto an avatar and rendering the superimposed portion of the first live video stream on the avatar in the first image.

Embodiments of the present disclosure include a first user device comprising: a processor; and a computer-readable storage medium storing computer-readable instructions which, when executed by the processor, cause the processor to: receive a first image from a first camera; receive a first live video stream from a network location; generate a live image in real time, by superimposing a portion of the first live video stream received from the network location on to the first image received from the first camera; and display the generated live image.

Aspects of the above user device include wherein the first user device comprises the first camera and a second camera, the method further comprising receiving, with the processor, a second image from the second camera and transmitting, with the processor, the second image to the network location.

Aspects of the above user device include processing, with the processor, the first live video stream to detect a face of a user and extracting, with the processor, pixels of the first live video stream associated with the detected face of the user.

Aspects of the above user device include wherein the portion of the first live video stream comprises the extracted pixels of the first live video stream associated with the detected face of the user.

Aspects of the above user device include superimposing the pixels of the first live video stream associated with the detected face of the user on to a visual representation of a body.

Aspects of the above user device include wherein the first image from the first camera is taken in a direction opposite a direction of a first user of the first user device in relation to the first user device.

Aspects of the above user device include wherein the live image portrays a user of a second user device in front of the rear facing camera of the first user device.

Aspects of the above user device include receiving, with the processor, a second live video stream from a second network location, wherein generating the live image in real time comprising superimposing the portion of the first live video stream and a portion of the second live video stream on to the first image received from the first camera.

Aspects of the above user device include wherein the first live video stream is received from a second user device associated with a second user and the second live video stream is received from a third user device associated with a third user.

Aspects of the above user device include wherein the live image portrays the second user and the third user in front of the rear facing camera of the first user device.

Aspects of the above user device include wherein the first image is a live video.

Aspects of the above user device include superimposing the portion of the first live video stream received from the network location on to the first image received from the first camera comprises superimposing the portion of the first live video stream onto an avatar and rendering the superimposed portion of the first live video stream on the avatar in the first image.

Embodiments include a computer program product comprising: a non-transitory computer-readable storage medium having computer-readable program code embodied therewith, the computer-readable program code configured, when executed by a processor of a first user device, to: receive a first image from a first camera; receive a first live video stream from a network location; generate a live image in real time, by superimposing a portion of the first live video stream received from the network location on to the first image received from the first camera; and display the generated live image.

Aspects of the above computer program product include wherein the first user device comprises the first camera and a second camera, wherein the computer-readable program code is further configured, when executed by the processor, to receive a second image from the second camera and transmit the second image to the network location.

Aspects of the above computer program product include processing, with the processor, the first live video stream to detect a face of a user and extracting, with the processor, pixels of the first live video stream associated with the detected face of the user.

Aspects of the above computer program product include wherein the portion of the first live video stream comprises the extracted pixels of the first live video stream associated with the detected face of the user.

Aspects of the above computer program product include superimposing the pixels of the first live video stream associated with the detected face of the user on to a visual representation of a body.

Aspects of the above computer program product include wherein the first image from the first camera is taken in a direction opposite a direction of a first user of the first user device in relation to the first user device.

Aspects of the above computer program product include wherein the live image portrays a user of a second user device in front of the rear facing camera of the first user device.

Aspects of the above computer program product include receiving, with the processor, a second live video stream from a second network location, wherein generating the live image in real time comprising superimposing the portion of the first live video stream and a portion of the second live video stream on to the first image received from the first camera.

Aspects of the above computer program product include wherein the first live video stream is received from a second user device associated with a second user and the second live video stream is received from a third user device associated with a third user.

Aspects of the above computer program product include wherein the live image portrays the second user and the third user in front of the rear facing camera of the first user device.

Aspects of the above computer program product include wherein the first image is a live video.

Aspects of the above computer program product include superimposing the portion of the first live video stream received from the network location on to the first image received from the first camera comprises superimposing the portion of the first live video stream onto an avatar and rendering the superimposed portion of the first live video stream on the avatar in the first image.

Examples of the processors as described herein may include, but are not limited to, at least one of Qualcomm® Snapdragon® 800, 810, 820, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARIV1926EJ-S™ processors, Rockchip RK3399 processor, other industry-equivalent processors, and may perform computational functions using any known or future-developed standard, instruction set, libraries, and/or architecture.

A graphics processing unit ("GPU") as used herein may include any type of specialized, electronic circuit capable of manipulating and altering memory to accelerate the creation of images for output to a display device. Examples of GPUs as described herein may include, but are not limited to, at least one of an Intel, Nvidia, and AMD/ATI GPU and/or a mobile-device based GPU such as an S3 Graphics, Matrox, Adreno, PowerVR, and may perform functions using any known or future-developed standard instruction set, library, API, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, cloud-based computing systems, or virtual machine processing can also be constructed to implement the methods described herein.

In yet another embodiment, the disclosed methods may be readily implemented in conjunction with software that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of presenting a live video call, the method comprising performing operations as follows:
   receiving, with a processor of a first user device, a first live video stream from a first camera of the first user device;
   receiving, with the processor, a second live video stream from a network location;
   extracting, with the processor, a portion of the second live video stream received from the network location, wherein extracting the portion of the second live video stream comprises processing, with the processor, the second live video stream to detect a face of a user and extracting, with the processor, pixels of the second live video stream associated with the detected face of the user, wherein the portion of the second live video stream comprises the pixels associated with the detected face of the user;
   determining, with the processor, that the extracted portion of the second live video stream comprises a first portion of a body of a user;
   determining, with the processor, that the extracted portion of the second live video stream does not comprise a second portion of the body of the user;
   in response to determining that the extracted portion of the second live video stream comprises the first portion and does not comprise the second portion, generating, with the processor, a live superimposed video in real-time by superimposing at least a part of the extracted portion of the second live video stream onto an avatar superimposed on top of the first live video stream received from the first camera; and displaying, with the processor, the generated live superimposed video.

2. The method of claim 1, wherein the first user device comprises a second camera, the method further comprising receiving, with the processor, a third live video stream from the second camera and transmitting, with the processor, the third live video stream to the network location.

3. The method of claim 1, wherein the first live video stream from the first camera is taken in a direction opposite a direction of a user of the first user device in relation to the first user device.

4. The method of claim 1, wherein the live superimposed video is generated by superimposing a live video of a user of a second user device onto a live video of an environment containing the first user device.

5. The method of claim 1, further comprising receiving, with the processor, a third live video stream from a second network location, wherein generating the live superimposed video in real-time comprises superimposing the portion of the second live video stream and a portion of the third live video stream on top of the first live video stream received from the first camera.

6. The method of claim 5, wherein the second live video stream is received from a second user device associated with a second user and the third live video stream is received from a third user device associated with a third user.

7. The method of claim 6, wherein the live superimposed video portrays the second user and the third user in front of the first camera.

8. A first user device comprising:
a processor; and
a computer-readable storage medium storing computer-readable instructions which, when executed by the processor, cause the processor to:
receive a first live video stream from a first camera of the first user device;
receive a second live video stream from a network location;
extract a portion of the second live video stream received from the network location, wherein extracting the portion of the second live video stream comprises processing, with the processor, the second live video stream to detect a face of a user and extracting, with the processor, pixels of the second live video stream associated with the detected face of the user, wherein the portion of the second live video stream comprises the pixels associated with the detected face of the user;
determine that the extracted portion of the second live video stream comprises a first portion of a body of a user;
determine, with the processor, that the extracted portion of the second live video stream does not comprise a second portion of the body of the user;
in response to determining that the extracted portion of the second live video stream comprises the first portion and does not comprise the second portion, generate a live superimposed video in real-time by superimposing at least a part of the extracted portion of the second live video stream onto an avatar superimposed on top of the first live video stream received from the first camera; and
display the generated live superimposed video.

9. The first user device of claim 8, wherein the first user device comprises the first camera and a second camera, wherein the instructions further cause the processor to receive a third live video stream from the second camera and transmit the third live video stream to the network location.

10. The first user device of claim 8, wherein the first live video stream from the first camera is taken in a direction opposite a direction of a user of the first user device in relation to the first user device.

11. The first user device of claim 8, wherein the live superimposed video is generated by superimposing a live video of a user of a second user device onto a live video of an environment containing the first user device.

12. The first user device of claim 8, wherein the instructions further cause the processor to receive a third live video stream from a second network location, wherein generating the live superimposed video in real-time comprises superimposing the portion of the second live video stream and a portion of the third live video stream on top of the first live video stream received from the first camera.

13. The first user device of claim 12, wherein the second live video stream is received from a second user device associated with a second user and the third live video stream is received from a third user device associated with a third user.

14. The first user device of claim 13, wherein the live superimposed video portrays the second user and the third user in front of the first camera.

15. A computer program product comprising:
a non-transitory computer-readable storage medium having computer-readable program code embodied therewith, the computer-readable program code configured, when executed by a processor of a first user device, to:
receive a first live video stream from a first camera of the first user device;
receive a second live video stream from a network location;
extract a portion of the second live video stream received from the network location, wherein extracting the portion of the second live video stream comprises processing, with the processor, the second live video stream to detect a face of a user and extracting, with the processor, pixels of the second live video stream associated with the detected face of the user, wherein the portion of the second live video stream comprises the pixels associated with the detected face of the user;
determine that the extracted portion of the second live video stream comprises a first portion of a body of a user;
determine, with the processor, that the extracted portion of the second live video stream does not comprise a second portion of the body of the user;
in response to determining that the extracted portion of the second live video stream comprises the first portion and does not comprise the second portion, generate a live superimposed video in real-time by superimposing at least a portion of the extracted portion of the second live video stream onto an avatar superimposed on top of the first live video stream received from the first camera; and
display the generated live superimposed video.

16. The computer program product of claim 15, wherein the first user device comprises the first camera and a second camera, wherein the computer-readable program code is further configured, when executed by the processor, to receive a third live video stream from the second camera and transmit the third live video stream to the network location.

17. The computer program product of claim 15, wherein the first live video stream from the first camera is taken in a direction opposite a direction of a user of the first user device in relation to the first user device.

* * * * *